(12) United States Patent
Bryant et al.

(10) Patent No.: US 8,782,534 B2
(45) Date of Patent: Jul. 15, 2014

(54) INDEPENDENT VIEWING OF WEB CONFERENCE CONTENT BY PARTICIPANTS

(75) Inventors: Erik S. Bryant, Wake Forest, NC (US); Saurabh Dua, Durham, NC (US); Jaymin S. Patel, Morrisville, NC (US); Paul A. Smith, Cary, NC (US); Vladimir Soroka, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 12/902,216

(22) Filed: Oct. 12, 2010

(65) Prior Publication Data

US 2012/0089928 A1   Apr. 12, 2012

(51) Int. Cl.
*G06F 3/00*       (2006.01)
*G06Q 10/10*     (2012.01)
*H04L 12/18*     (2006.01)

(52) U.S. Cl.
CPC ......... *H04L 12/1827* (2013.01); *H04L 12/1822* (2013.01); *G06Q 10/10* (2013.01)
USPC ............ 715/751; 715/752; 715/753; 715/759

(58) Field of Classification Search
USPC .................................. 715/751, 752, 753, 759
See application file for complete search history.

(56) References Cited

U.S. PATENT DOCUMENTS

| | | | |
|---|---|---|---|
| 6,708,196 B1 * | 3/2004 | Atkinson et al. | 718/102 |
| 7,085,842 B2 | 8/2006 | Reid et al. | |
| 7,916,848 B2 * | 3/2011 | Rui et al. | 379/202.01 |
| 8,185,828 B2 * | 5/2012 | Liu et al. | 715/753 |
| 2003/0110218 A1 | 6/2003 | Stanley | |
| 2006/0265653 A1 * | 11/2006 | Paasonen et al. | 715/704 |
| 2006/0288389 A1 * | 12/2006 | Deutscher et al. | 725/88 |
| 2007/0044017 A1 * | 2/2007 | Zhu et al. | 715/530 |
| 2007/0089061 A1 * | 4/2007 | Terada | 715/723 |
| 2007/0185956 A1 | 8/2007 | Ogle et al. | |
| 2008/0055286 A1 * | 3/2008 | Garg et al. | 345/204 |
| 2008/0184137 A1 * | 7/2008 | Grimm et al. | 715/760 |
| 2008/0301562 A1 * | 12/2008 | Berger et al. | 715/733 |
| 2010/0023849 A1 * | 1/2010 | Hakim et al. | 715/202 |
| 2010/0058410 A1 * | 3/2010 | Rance et al. | 725/109 |
| 2011/0221766 A1 * | 9/2011 | Ko et al. | 345/629 |
| 2012/0023407 A1 * | 1/2012 | Taylor | 715/731 |

* cited by examiner

*Primary Examiner* — Kieu Vu
*Assistant Examiner* — Andrew Chung
(74) *Attorney, Agent, or Firm* — Charles L. Moore; Moore & Van Allen PLLC

(57) ABSTRACT

A method for allowing independent viewing of web conference content may include enumerating a plurality of windows of content of a web conference to allow caching of visible and non-visible portions of each enumerated window by a client computer device of a participant to provide independent viewing of each enumerated window by the participant in the web conference. The method may also include forming a bitmap of visible and non-visible portions of each enumerated window. The method may further include transmitting the bitmap of each enumerated window to the client computer device of the participant in the web conference.

15 Claims, 3 Drawing Sheets

INDEPENDENT VIEWING OF WEB CONFERENCE CONTENT BY PARTICIPANTS

BACKGROUND

Aspects of the present invention relate to conferencing over a network or web conferencing, and more particularly to a method, system and computer program product for independent viewing of web conference content by participants during the web conference.

Web conferencing has become a widely used tool or application for holding meetings, particularly when meeting participants or attendees are located in different geographic locations. Participants can attend or participate in the meeting from their own office or other convenient location and do not have the expense and time involved in having to travel to a remote location. Currently a web conference streams the data or content of a controlling party which may be a moderator or current presenter of content directly from the controlling party's computer. The controlling party typically has exclusive control over navigation within the presentation materials or content associated with a window currently being presented in the web conference. Accordingly, the web conference participants cannot navigate to independently view other windows or non-visible portions of the web conference content.

BRIEF SUMMARY

According to an aspect of the present invention, a method for allowing independent viewing of web conference content may include enumerating a plurality of windows of content of a web conference to allow caching of visible and non-visible portions of each enumerated window by a client computer device of a participant to provide independent viewing of each enumerated window by the participant in the web conference. The method may also include forming a bitmap of visible and non-visible portions of each enumerated window. The method may further include transmitting the bitmap of each enumerated window to the client computer device of the participant in the web conference for independent viewing of each enumerated window by the participant.

According to another aspect of the present invention, a system for allowing independent viewing of web conference content may include a processing device. The system may also include a module operating on the processing device for allowing independent viewing of web conference content. The module may include a sub-module to enumerate a plurality of windows of content of a web conference to allow caching of visible and non-visible portions of each enumerated window by a client computer device of a participant to provide independent viewing of each enumerated window by the participant in the web conference. The module may include another sub-module for forming a bitmap of visible and non-visible portions of each enumerated window. The module may include a further sub-module to transmit the bitmap of each enumerated window to the client computer device of the participant in the web conference for independent viewing of each enumerated window by the participant.

According to a further aspect of the present invention, a computer program product for allowing independent viewing of web conference content may include a computer readable storage medium having computer readable program code embodied therewith. The computer readable program code may include computer readable program code configured to enumerate a plurality of windows of content of a web conference to allow caching of visible and non-visible portions of each enumerated window by a client computer device of a participant to provide independent viewing of each enumerated window by the participant in the web conference. The computer readable program code may also include computer readable program code configured to form a bitmap of visible and non-visible portions of each enumerated window. The computer readable program code may additionally include computer readable program code configured to form a bitmap of visible and non-visible portions of each enumerated window. The computer readable program code may further include computer readable program code configured to transmit the bitmap of each enumerated window to the client computer device of the participant in the web conference for independent viewing of each enumerated window by the participant.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
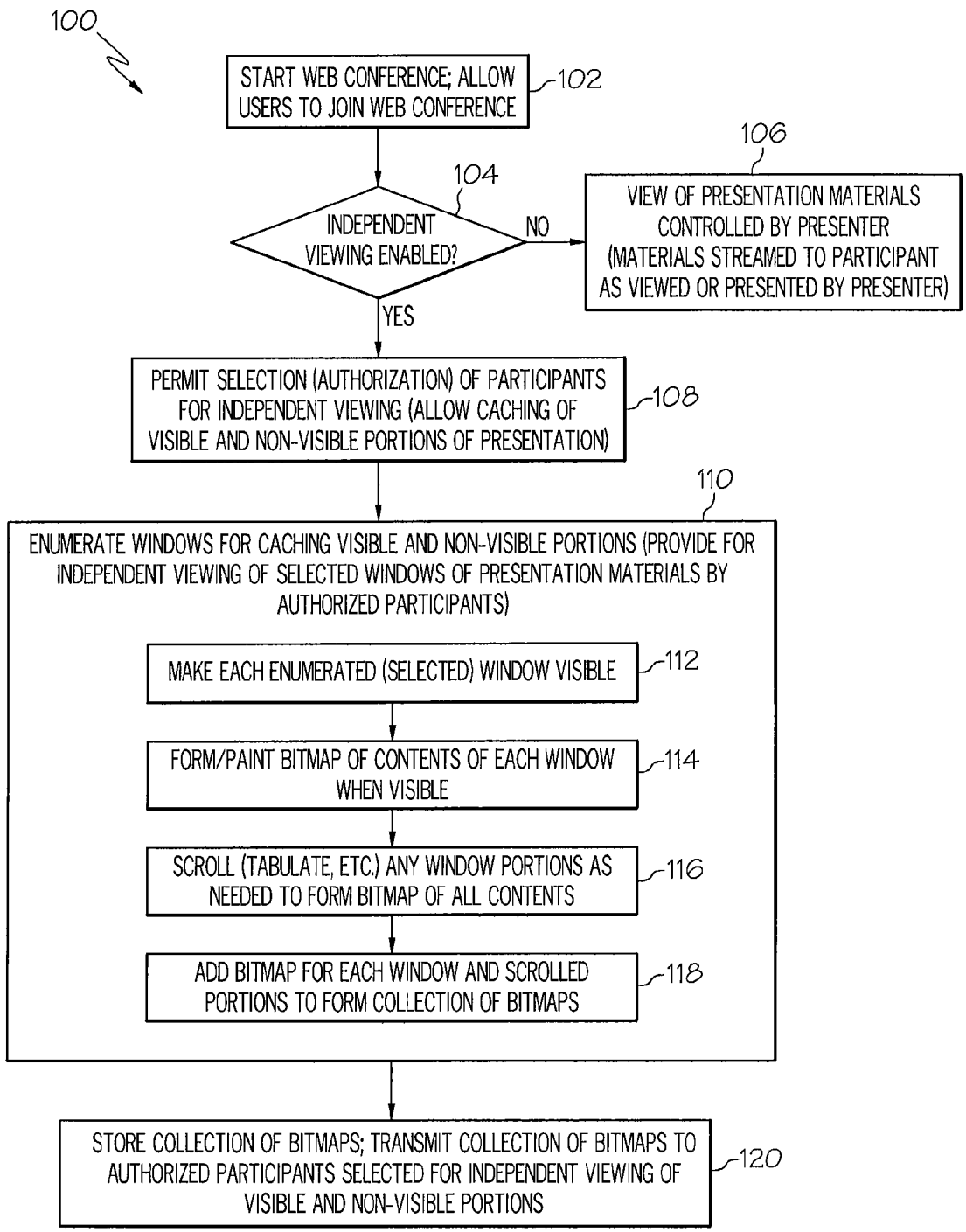
FIG. 1 is a flowchart of an example of a method for allowing independent viewing of web conference content by authorized participants in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of an example of a method 100 for allowing independent viewing of web conference content by authorized participants in accordance with an embodiment of the present invention. In block 102, the web conference may be started. The web conference may be started by a moderator using a computer system or device to access a server that may include a module for performing web conferencing services similar to that described herein. An example of a system for web conferencing will be described in more detail with reference to FIG. 3. Also in block 102, users or participants may be allowed to join the web conference or participants may be invited to join the web conference.

In block 104, a determination may be made whether independent viewing is enabled to permit independent viewing of the web conference content as described herein. The web conference content may include but is not necessarily limited to presentation materials that may be presented over a network to the web conference participants. As described herein, independent viewing may include allowing the participants to independently navigate through the web conference content or presentation materials. Accordingly, the participant may view a different window or a different portion of a window other than a current window or a current portion of a window currently being viewed and presented in the web conference by a moderator or presenter in the web conference. Without the present invention, different windows or different portions of a window that are currently not being viewed and presented in the web conference would not be visible to the participants until the moderator or presenter actually viewed and presented the non-visible window or window portions. The present invention also permits participants to independently move forward or go back in the windows of the web conference content.

The moderator may selectively enable or disable the independent viewing feature. A graphical user interface or other feature may be presented to the moderator for selecting to enable or disable the independent viewing feature.

If the independent viewing feature is not enabled in block 104, the method 100 may advance to block 106. In block 106, viewing of the web conference content or presentation materials is controlled by the presenter or moderator. The presentation materials may be streamed to the participants as viewed or presented by the presenter. The participants will have no ability to independently view or navigate through the web conference content and to view content which is not currently visible or made available by the presenter.

If the independent viewing feature is enabled in block 104, the method 100 may advance to block 108. In block 108, the moderator or presenter may be permitted to select or authorize selected participants for independent viewing or independent navigation of the web conference content. The authorized or selected participants may be allowed to cache the visible and non-visible portions of the web conference content or presentation materials on their respective client computer systems or devices.

In block 110, a plurality of windows containing the web conference content or presentation materials may be enumerated to provide for independent viewing of the windows by the authorized participants. Windows of the web conference content may be selected or chosen from the plurality of windows for independent viewing or navigation by the authorized participants. The windows selected for independent viewing may be selected by the presenter or moderator.

In block 112, each enumerated or selected window may be made visible for forming or painting a bitmap in block 114. This bitmapping process may happen in a substantially minimal time period and may be substantially transparent to the web conference participants. The bitmapping process may involve but is not necessarily limited to going through every window of the web conference content on a desktop of a presenter, moderator or other participant and making each window visible for a short period of time. The window may then be copied to an invisible canvas or a similar graphical object. A resident program may continuously copy the contents of every window and every screen as they refresh in the operating system and maintain a current content of all windows and screens. Invisible canvas is a known technique to make a program paint its contents without the user actually seeing it. For example, invisible canvas is a graphical object on which Microsoft Windows programs may paint or store their content. Invisible canvas does not exist visually but only in memory. Microsoft Windows is a trademark of the Microsoft Corporation in the United States, other countries or both.

In block 116, each window may be navigated, such as by scrolling, tabulating or otherwise manipulated by any mechanism as may be needed to bring into view or to reveal any non-visible portions of each window. For an example, each window may be automatically navigated, scrolled, tabulated or the like to reveal non-visible portions of each window similar to that commonly known in the computing arts.

Figure 2A:
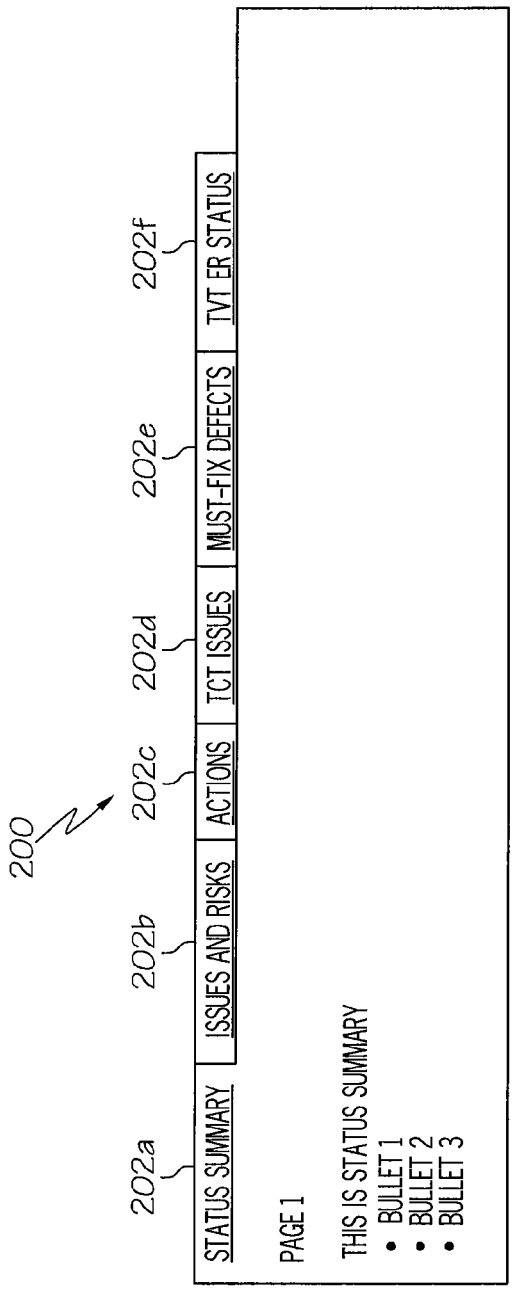
FIGS. 2A and 2B are an illustration of an example of bringing into view non-visible portions of a window of web conference content to form a bitmap including the non-visible portions in accordance with an embodiment of the present invention.
Figure 2B:
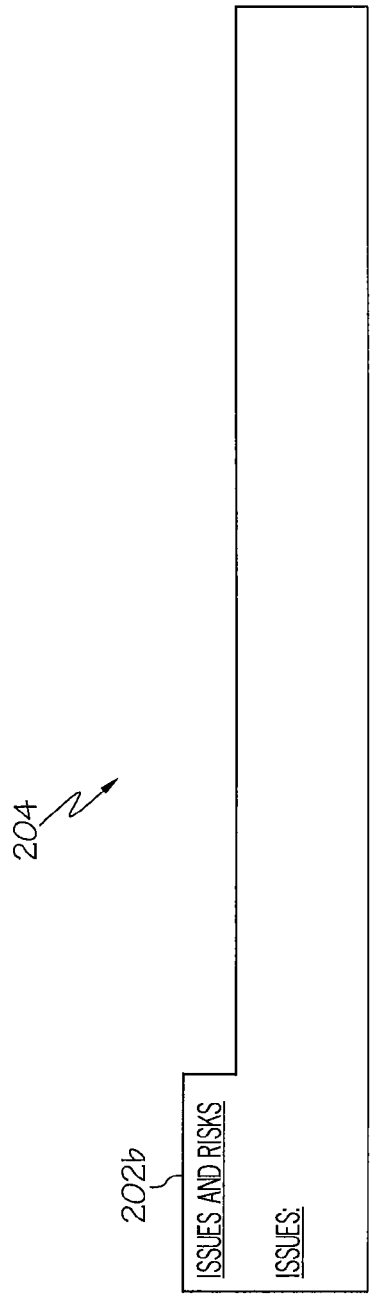

As another example, referring also to FIGS. 2A and 2B, FIGS. 2A and 2B are an illustration of an example of bringing into view non-visible portions of a window of web conference content to form a bitmap including the non-visible portions in accordance with an embodiment of the present invention. FIG. 2A is an example of a window 200 including multiple tabs 202a-202f. Only one tab may be active and visible in the window 200 and at time. In the example illustrated in FIG. 2A, only the contents of the tab 202a entitled "Status Summary" are visible. The method 100 may automatically tabulate or activate each tab to make visible the non-visible contents of the different tabs 202a-202f. In FIG. 2B, the tab 202b is active and the contents of tab 202b are visible in the window 204.

Returning to FIG. 1, in block 118, a bitmap for each window and navigated, scrolled or tabulated non-visible portions may be combined or added to form a collection of bitmaps of the web conference content or presentation materials. A bitmap may be formed including visible and non-visible portions of the each window or each selected window by bringing into view any non-visible portions of each window or selected window by whatever mechanism may be used to reveal the non-visible portions similar to that previously described.

The functions and operations described with respect to blocks 112-118 may be considered to be part of enumerating each window of block 110 similar to that illustrated in FIG. 1 or may be separate, distinct operations.

In block 120, the collection of bitmaps may be stored. For example, the collection of bitmaps may be stored on a web conference server or on another storage device associated with the web conference server. The collection of bitmaps may be transmitted to the participants authorized or selected for independent viewing of the visible and non-visible portions of the web conference content. The collection of bitmaps may be formed and transmitted to the participants substantially immediately upon being made available for the enumerating process. As described herein, the collection of bitmaps may be cached on a computer device associated with each participant immediately before the web conference starts or substantially concurrent with a beginning of the web conference so that the web conference content is available to the selected participants for independent viewing. Each participant of the web conference may be defined as authorized or not authorized to view specific invisible portions of the screen or content. The conference moderator may determine which participants may be authorized to view the non-visible portions or to independently navigate through the windows or screens before the conference starts or during the conference. Each authorized participant may receive a copy of the bitmaps corresponding to invisible windows he is authorized to see and also subscribes to any changes in those windows. When such a change occurs, for example a new letter is added to the invisible screen, all subscribers will receive an updated bitmap or will receive an incremental change and the participant's computer system or communications device may update the bitmap.

Figure 3:
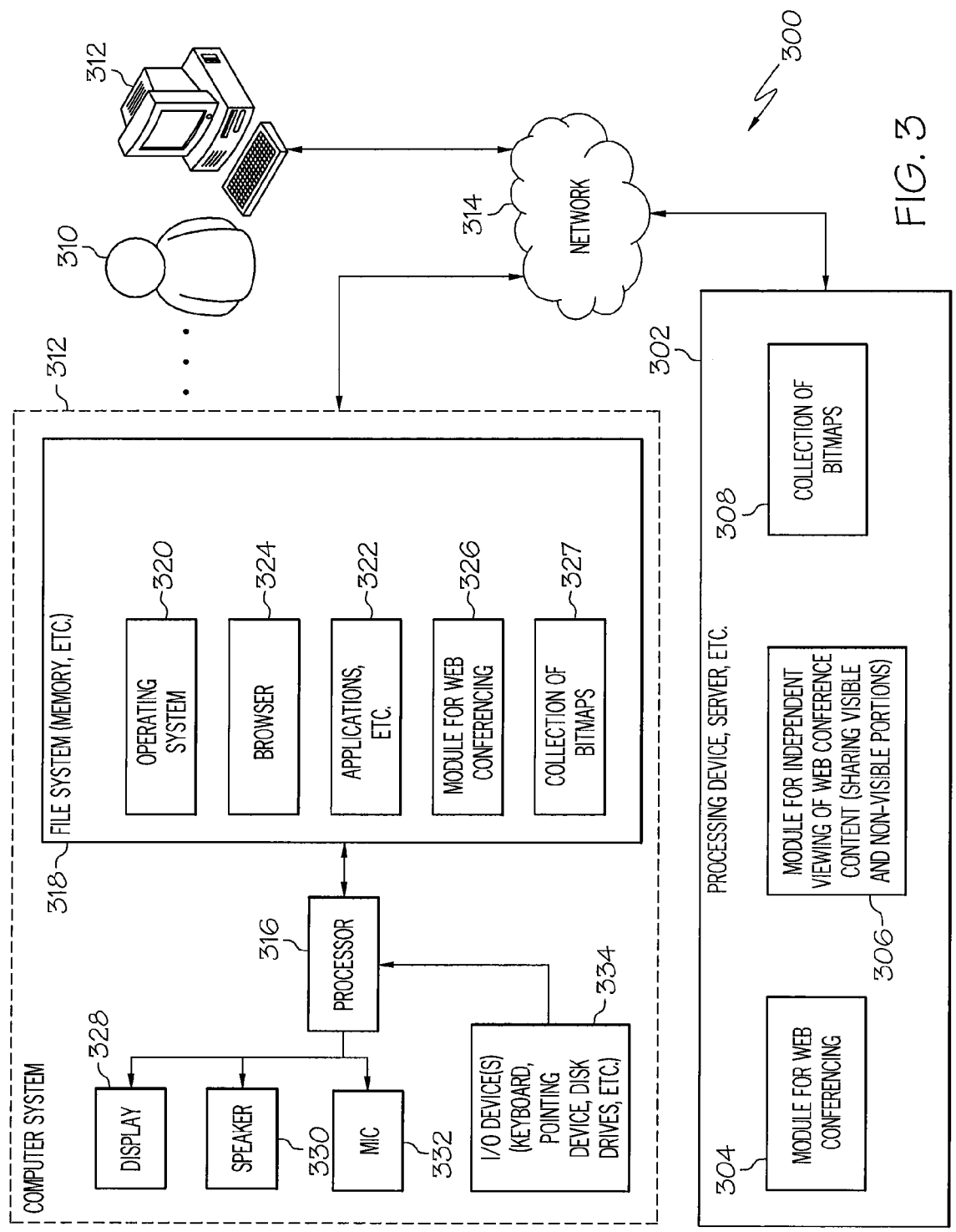
FIG. 3 is a block schematic diagram of an example of a system for allowing independent viewing of web conference content by authorized participants in accordance with an embodiment of the present invention.

FIG. 3 is a block schematic diagram of an example of a system 300 for allowing independent viewing of web conference content by authorized participants in accordance with an embodiment of the present invention. The method 100 of FIG. 1 may be embodied in or performed by elements of the system 300. The system 300 may include a server 302 or processing device. The servers 302 may be a web conferencing server or similar processing device for hosting a web conferencing service. A module 304 for web conferencing may be operable on the server or web server 302 for providing the web conferencing services described herein.

A module 306 for independent viewing of web conference content may also be operable on the server or web server 302. Portions of or all of the method 100 may be embodied in or performed by the module 306. As previously discussed, the module 306 may permit web conference participants or authorized participants to independently navigate through the different windows associated with web conference content and presentation materials being presented during a web conference. Authorized participants may view visible and non-visible portions of the web conference content and presentation materials independently from what the moderator or presenter may be currently viewing and presenting in the web conference.

A collection of bitmaps 308 that may be formed by the module 306 similar to that described with reference to FIG. 1 and may be stored on the server 302 or on another data storage device associated with the server 302.

A user or web conference participant 310 may use a computer system 312 to access the web conferencing server 302 and module 306 via a network 314. The computer system 312 may be any type of communications device including a mobile communications device or the like capable of performing the functions or operations described herein and capable of permitting a user to participate in a web conference. The network 314 may be the Internet, an intranet or other private or proprietary network.

The computer system 312 may include a processor 316 to control operation of the computer system 312 and a file system 318, memory or similar data storage device. An operating system 320, applications 322 and other programs may be stored on the file system 318 for running or operating on the processor 316. A web or Internet browser 324 may also be stored on the file system 318 for accessing the web conferencing server 302 via the network 314 for participating in the web conference.

A module for web conferencing 326 may also be stored on the file system 318 for operation on the processor 316. The module for web conferencing 326 may perform functions associated with participation by the user 310 or participant in a web conference and may coordinate with the module 306 for independent viewing of the web conference content as described herein.

A collection of bitmaps 327 may also be stored on the file system 318 of the computer system 312. The collection of bitmaps 327 may be the same as the collection of bitmaps 308 on the server 302 which have been transmitted to the computer system 312 of the user 310 or participant via the network 314.

The computer system 312 may also include a display 328 for presenting the content being shared or streamed by the web conferencing server 302. The computer system 312 may also include a speaker system 330 for receiving and presenting audio content from the web conferencing server 302 to the user 310. The computer system 312 may additionally include a microphone 332 for the user 310 to communicate with the moderator of the web conference and with other participants of the web conference and to make any presentation if the user 310 is a presenter in the web conference.

The computer system 312 may further include one or more input devices, output devices or combination input/output devices, collectively I/O devices 334. The I/O devices 334 may include a keyboard, pointing device, such as a mouse or other computer pointing device, disk drives and any other devices to permit a user, such as user 310, to interface with and control operation of the computer system 312 and to access the web conferencing server 302.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for allowing independent viewing of web conference content, comprising:
    enumerating each of a plurality of windows of content of a web conference on a desktop of a computer device of a presenter, wherein enumerating each of the plurality of windows comprises automatically making each window visible one-by-one on the desktop of the computer device of the presenter, and wherein the enumerating of each of the plurality of windows is transparent to a participant of the web conference;
    forming a bitmap of visible and non-visible portions of each enumerated window as each window is visible on the desktop of the computer device of the presenter to include all contents of each enumerated window in the bitmap, wherein forming the bitmap including visible and non-visible portions of each enumerated window comprises automatically bringing into view any non-visible portions of each enumerated window on the desktop of the computer device of the presenter to form the bitmap including all contents of each enumerated window;
    forming a collection of bitmaps by adding the bitmaps of the visible and non-visible portions for each enumerated window; and
    transmitting the collection of bitmaps including all contents of each enumerated window to a client computer device of the participant in the web conference to allow caching of all contents of each enumerated window by the client computer device of the participant to provide independent viewing of all contents of each enumerated window by the participant in the web conference.

2. The method of claim 1, wherein independent viewing of each enumerated window by the participant comprises allowing the participant to view a different window or a different portion of a window other than a current window or a current portion of a window currently being viewed and presented in the web conference by a moderator or the presenter in the web conference.

3. The method of claim 1, further comprising allowing a moderator or presenter to selectively enable or disable independent viewing of the web conference content by participants.

4. The method of claim 1, further comprising presenting each enumerated window of the web conference content to the participant only when viewed and presented by a moderator or presenter in the web conference in response to independent viewing of the web conference content not being enabled.

5. The method of claim 1, further comprising permitting a selection of web conference participants for authorization for independent viewing of the web conference content.

6. The method of claim 1, wherein automatically bringing into view any non-visible portions of each enumerated window to form the bitmap comprises at least one of automatically scrolling each enumerated window to reveal non-visible portions of each enumerated window and automatically activating different tabs of a tabulated window to make visible content of different tabs.

7. The method of claim 1, further comprising storing the collection of bitmaps including all contents of each enumerated window on a web conference server.

8. The method of claim 7, further comprising transmitting the collection of bitmaps to web conference participants authorized to independently view each enumerated window of the web conference content.

9. The method of claim 1, wherein enumerating each enumerated window of the web conference content comprises allowing selection of windows of the web content for independent viewing.

10. The method of claim 1, further comprising permitting a moderator or presenter to authorize selected participants independent viewing of the web conference content.

11. A system for allowing independent viewing of web conference content, comprising:
   a processor; and
   a module operating on the processing device for allowing independent viewing of web conference content, the module comprising:
      a sub-module to enumerate a plurality of windows of content of a web conference on a desktop of a computer device of a presenter, wherein each of the plurality of windows is enumerated by automatically making each window visible one-by-one on the desktop of the computer device of the presenter, and wherein the enumerating of each of the plurality of windows is transparent to a participant of the web conference;
      a sub-module for forming a bitmap of visible and non-visible portions of each enumerated window as each enumerated window is visible on the desktop of the computer device of the presenter to include all contents of each enumerated window in the bitmap, wherein forming the bitmap including visible and non-visible portions of each enumerated window comprises automatically bringing into view any non-visible portions of each enumerated window on the desktop of the computer device of the presenter to form the bitmap including all contents of each enumerated window;
      a sub-module to form a collection of bitmaps by adding the bitmaps of the visible and non-visible portions for each enumerated window; and
      a sub-module to transmit the collection of bitmaps including all contents of each enumerated window to a client computer device of the participant in the web conference to allow caching of all contents of each enumerated window by the client computer device of the participant to provide independent viewing of all contents of each enumerated window by the participant in the web conference.

12. The system of claim 11, further comprising a module to permit a selection of web conference participants for authorization for independent viewing of the web conference content.

13. The system of claim 11,
   wherein the collection of bitmaps are transmitted to web conference participants authorized to independently view each enumerated window of the web conference content.

14. A computer program product for allowing independent viewing of web conference content, the computer program product comprising:
   a non-transitory computer readable storage medium having computer readable program code embodied therewith, the computer readable program code comprising:
   computer readable program code configured to enumerate each of a plurality of windows of content of a web conference on a desktop of a computer device of a presenter, wherein each of the plurality of windows is enumerated by automatically making each window visible one-by-one on the desktop of the computer device of the presenter, and wherein the enumerating of each of the plurality of windows is transparent to a participant of the web conference;
   computer readable program code configured to form a bitmap of visible and non-visible portions of each enumerated window as each window is visible on the desktop of the computer device of the presenter to include all contents of each enumerated window in the bitmap, wherein forming the bitmap including visible and non-visible portions of each enumerated window comprises automatically bringing into view any non-visible portions of each enumerated window on the desktop of the computer device of the presenter to form the bitmap including all contents of each enumerated window;
   computer readable program code configured to form a collection of bitmaps by adding the bitmaps of the visible and non-visible portions for each enumerated window; and
   computer readable program code configured to transmit the collection of bitmaps including all contents of each enumerated window to a client computer device of the participant in the web conference to allow caching of all contents of each enumerated window by the client computer device of the participant to provide independent viewing of all contents of each enumerated window by the participant in the web conference.

15. The computer program product of claim 14, further comprising computer readable program code configured to permit a selection of web conference participants for authorization for independent viewing of the web conference content.

* * * * *